United States Patent
Grannaes (10) Patent No.: US 12,204,891 B2
(45) Date of Patent: *Jan. 21, 2025

(54) METHOD FOR PATCHING CODE LOCATED IN ONE TIME PROGRAMMABLE MEMORY

(71) Applicant: Silicon Laboratories Inc., Austin, TX (US)

(72) Inventor: Marius Grannaes, Hosle (NO)

(73) Assignee: Silicon Laboratories Inc., Austin, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/106,766

(22) Filed: Feb. 7, 2023

(65) Prior Publication Data

US 2024/0264825 A1 Aug. 8, 2024

(51) Int. Cl.
*G06F 9/44* (2018.01)
*G06F 8/65* (2018.01)

(52) U.S. Cl.
CPC ..................... *G06F 8/66* (2013.01)

(58) Field of Classification Search
CPC .......................................................... G06F 8/66
USPC ....................................................... 717/168
See application file for complete search history.

(56) References Cited

U.S. PATENT DOCUMENTS

| | | | |
|---|---|---|---|
| 7,310,800 B2 | 12/2007 | Brouwer | |
| 7,739,469 B2 * | 6/2010 | Jessani | G06F 9/32 711/170 |
| 7,886,287 B1 * | 2/2011 | Davda | G06F 9/322 717/168 |
| 11,106,457 B1 * | 8/2021 | Subramanian | G06F 8/656 |
| 2008/0184072 A1 * | 7/2008 | Odlivak | G06F 11/3628 714/E11.207 |
| 2011/0107070 A1 * | 5/2011 | Barbulescu | G06F 8/66 712/E9.035 |
| 2012/0030762 A1 * | 2/2012 | Klein | G06F 21/57 726/23 |

\* cited by examiner

*Primary Examiner* — Evral E Bodden
(74) *Attorney, Agent, or Firm* — Nields, Lemack & Frame, LLC (57) ABSTRACT

Methods of performing updates to a software image that is disposed in a one time programmable (OTP) memory device are disclosed. The method includes writing an invalid opcode at the beginning of a function that has been modified. This invalid opcode causes an exception. The exception handler determines the address where the invalid opcode was located and searches a random access memory (RAM) dictionary. This RAM dictionary contains entries that each have an original address in the OTP Memory and the patch address in a volatile memory. The exception handler then causes the processing unit to jump to the patch address, where a modified function is located.

17 Claims, 5 Drawing Sheets

| |
|---|
| CRC 400 |
| MAGIC NUMBER 405 |
| SIZE OR PATCH FILE 410 |
| VERSION NUMBER 415 |
| PRODUCT CODE 420 |
| EXCEPTION HANDLER POINTER 425 |
| SIZE OF PATCHED FUNCTIONS 430 |
| CRYPTOGRAPHIC SIGNATURE 431 |
| PATCHED FUNCTIONS 435 |
| SIZE OF PATCH TABLE 440 |
| PATCH TABLE 445 (ORIGINAL ADDRESS, PATCH ADDRESS) |

FIG. 5

METHOD FOR PATCHING CODE LOCATED IN ONE TIME PROGRAMMABLE MEMORY

FIELD

This disclosure describes a method for patching code located in one time programmable (OTP) memory.

BACKGROUND

In many network devices, FLASH memory is used to store the code that is executed by the network device. FLASH memory has the benefit that it is rewritable, so that any changes, bug fixes, or enhancements that are made to the code after the device has been delivered to a customer can be easily applied to the network device.

Typically, this may be done by delivering a patch file to the network device. This patch file contains the changes, modifications and enhancements that are to be applied to the code. The network device may store this new code in volatile memory, such as RAM. The FLASH memory is then reprogrammed using this new code.

However, in some embodiments, it may be beneficial to utilize one time programmable (OTP) memory in a network device. This may be due to cost constraints or another motivation. The technique described above is not suitable for OTP memory, since this OTP memory cannot be reprogrammed.

Other patching techniques are used for read only memory (ROM). These techniques include creating jump tables in the code to allow for the possibility that functions may be changed. This approach requires that jump tables are located in RAM. When a function is called, the software looks to the jump table to determine the address of the function (i.e., in ROM or in RAM). When patches are later applied to the software, the jump table is updated to point to the new patched functions. However, this approach utilizes extra code space and extra RAM space. Furthermore, as noted above, this approach is unnecessary for FLASH-based systems.

In certain systems, it may be desirable to have a software development kit (SDK) that is used for a family of products. Further, in some cases, it is desirable to use this SDK to create the same software for both FLASH-based devices as well as OTP-based devices. This reduces the development effort as only one SDK has to be maintained.

Therefore, it would be beneficial if there was a method that allowed the patching of code located in OTP memory that was simple to implement. Further, it would be advantageous if this method allowed a single SDK to be used for both FLASH-based and OTP-based devices.

SUMMARY

Methods of performing updates to a software image that is disposed in a one time programmable memory device are disclosed. The method includes writing an invalid opcode at the beginning of a function that has been modified. This invalid opcode causes an exception. The exception handler determines the address where the invalid opcode was located and searches a RAM dictionary. This RAM dictionary contains entries that each have an original address in the OTP Memory and the patch address in a volatile memory. The exception handler then causes the processing unit to jump to the patch address, where a modified function is located.

According to one embodiment, a method of updating software located in a one time programmable (OTP) memory device is disclosed. The method comprises storing a modified function at a patch address in a volatile memory device; creating an entry in a RAM dictionary located in the volatile memory device, wherein the entry comprises an original address of an original function in the OTP memory device and the patch address; and overwriting an opcode at the original address with an invalid opcode so as to invoke an exception. In some embodiments, the invalid opcode comprises either all 1s or all 0s. In some embodiments, the method comprises creating an entry in an OTP dictionary in the OTP memory device, wherein the entry comprises the original address of the original function and the opcode originally at the original address prior to being overwritten. In certain embodiments, the entry in the OTP dictionary is created prior to overwriting the opcode. In certain embodiments, the entry in the OTP dictionary is created only if the opcode has not been overwritten previously. In some embodiments, the method comprises storing an exception handler in the volatile memory device, which is executed when the exception is invoked.

According to another embodiment, a method of executing instructions located in a one time programmable (OTP) memory device using a processing unit is disclosed, wherein the instructions include a function that has been modified and a modified function is located at a patch address in a volatile memory device. The method comprises encountering an invalid opcode at an original address corresponding to a beginning of the function; and executing an exception handler, wherein the exception handler causes the processing unit to: determine a value of a program counter when the invalid opcode was encountered, the value of the program counter being the original address; search a RAM dictionary, located in the volatile memory device, wherein the RAM dictionary comprises an entry that comprises the original address and the patch address; jump to the patch address corresponding to the original address; and execute the modified function. In some embodiments, the invalid opcode comprises either all 1s or all 0s. In some embodiments, the exception handler is located in the volatile memory device.

According to another embodiment, method of executing instructions located in a one time programmable (OTP) memory device using a processing unit is disclosed, wherein an opcode at a beginning of an original function disposed in OTP has been modified to an invalid opcode. The method comprises encountering the invalid opcode at an original address corresponding to the beginning of the original function; and executing a default exception handler or an exception handler in response to the invalid opcode, wherein the default exception handler causes the processing unit to execute the original function and the exception handler causes the processing unit to execute a modified function located in a volatile memory device.

In some embodiments, the invalid opcode overwrote an original opcode during a previous patch. In some embodiments, the default exception handler causes the processing unit to: determine a value of a program counter when the invalid opcode was encountered, the value of the program counter being a fault address; search an OTP dictionary, located in the OTP memory device, wherein the OTP dictionary comprises an entry that comprises the fault address and the original opcode; create one or more instructions in the volatile memory device using the original opcode; execute the one or more instructions; and execute a remainder of the original function. In some embodiments, the exception handler causes the processing unit to: determine a value of a program counter when the invalid opcode was encountered, the value of the program counter being the original address; search a RAM dictionary, located in the volatile memory device, wherein the RAM dictionary comprises an entry that comprises the original address and a patch address; jump to the patch address corresponding to the original address; and execute the modified function located starting at the patch address. In some embodiments, the default exception handler is executed until the modified function and the RAM dictionary are written in the volatile memory device. In some embodiments, the invalid opcode comprises either all 1s or all 0s. In some embodiments, the exception handler is located in the volatile memory device. In some embodiments, the default exception handler is located in the OTP memory device.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
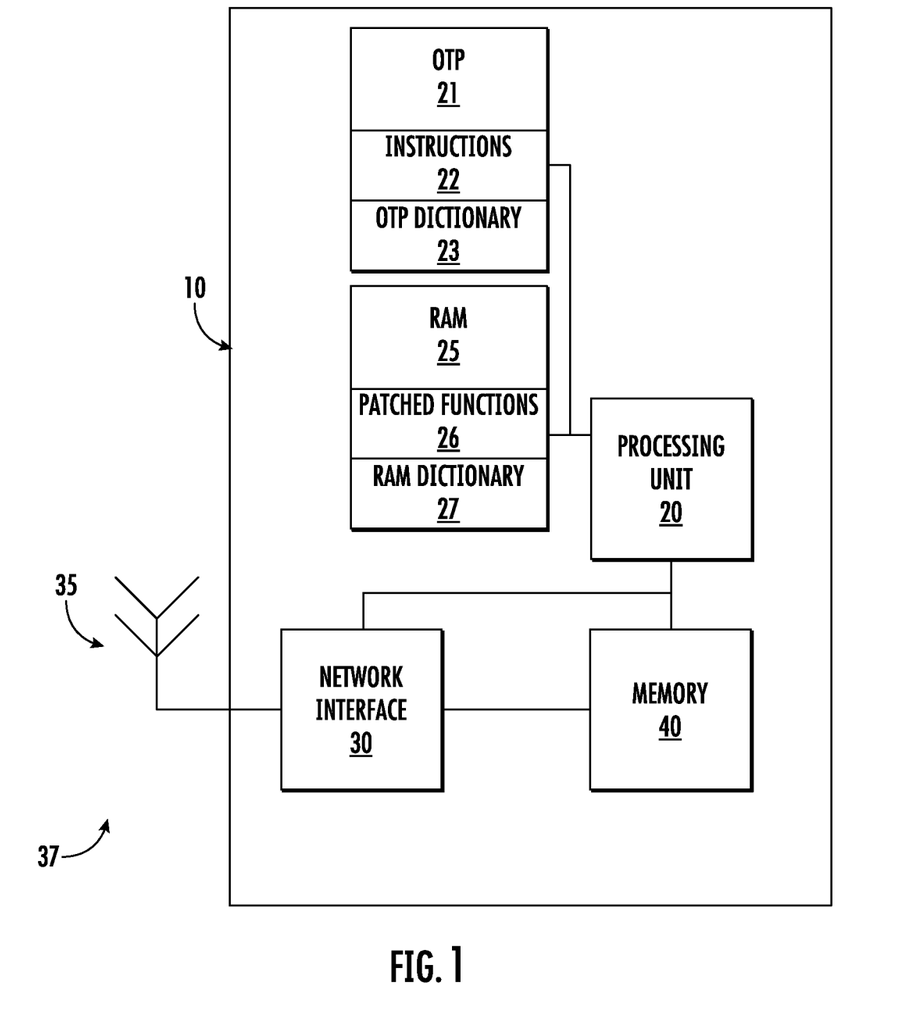
FIG. 1 shows a block diagram of a network device according to one embodiment.

FIG. 1 shows a block diagram of a representative network device 10 that is adapted to implement the method of patching code described herein.

The network device 10 has a processing unit 20 and associated memory devices. The processing unit 20 may be any suitable component, such as a microprocessor, embedded processor, an application specific circuit, a programmable circuit, a microcontroller, or another similar device. The associated memory devices include a one time programmable (OTP) memory device 21. This OTP memory device 21 contains the instructions 22, which, when executed by the processing unit 20, enable the network device 10 to perform the desired functions. The associated memory devices also include a volatile memory, such as a random access memory (RAM) device 25. The RAM device 25 contains the patched functions 26, as described in more detail later. Thus, the OTP memory device 21 and the RAM device 25 are both computer readable non-transitory storage media.

The network device 10 also includes a network interface 30 that connects with a network 37 using an antenna 35. The network interface 30 may support any wireless protocol, such as Bluetooth, Zigbee, WIFI or others. In other embodiments, an antenna 35 is not included, and the network interface 30 supports a wired protocol, such as Ethernet.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other devices in the network 37.

Although not shown, the network device 10 also has a power supply, which may be a battery or a connection to a permanent power source, such as a wall outlet.

While the processing unit 20, the OTP memory device 21, the RAM device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

When the network device is initially powered, the processing unit 20 executes the instructions 22 located in the OTP memory device 21. The network device 10 may operate in this manner until some change to the instructions is required. As noted above, the instructions 22 are stored in OTP memory device 21, and therefore, the changes cannot be made directly to the instructions.

Thus, the changes to the instructions 22, which may be contained within a patch file downloaded to the network device, must be supplied in the RAM device 25. Specifically, the changes to the instructions, which are in the form of changes to software functions, are made in the RAM device 25. These changes to software functions are stored as patched functions 26 in a portion of the RAM device 25.

Thus, when functions in the instructions 22 need to be modified, the patched functions 26 are written into a portion of the RAM device 25. In this way, when the processing unit 20 attempts to execute a function which has been modified, the processing unit 20 jumps to the respective patched function 26 in the RAM device 25 and executes the patched function 26 from this location. After completing execution of the patched function 26, the processing unit 20 returns to normal operation.

The present disclosure describes a method by which the processing unit 20 can detect a function that has been modified, and can jump to the associated patched function 26 which is stored at a known address in a portion of the RAM device 25.

This method utilizes a RAM dictionary 27, which is located in the RAM device 25. The RAM dictionary 27 is a table of entries, wherein each entry includes the address of the function to be modified (also known as the original address), and the address in the RAM device 25 where the respective patched function is located (also referred to as the patch address). Thus, instead of executing the function located at the original address in the OTP memory device 21, the processing unit 20 executes the modified function located at the patch address in the RAM device 25.

Thus, the RAM dictionary 27 provides the correlation between original addresses in the OTP memory device 21 and patch addresses in the RAM device 25. It is also necessary to have a mechanism wherein the processing unit 20 recognizes that it has started executing a function that has been modified.

The present method addresses this issue by intentionally overwriting the first instruction located at the original address in the OTP memory device 21. The processing unit 20 overwrites this first instruction with a value that does not correspond to any opcodes in the instruction set. For example, for certain processing units, the opcode 0xFF or 0xFFFF is not used. Thus, the processing unit 20 may overwrite the first instruction of the function with an invalid opcode, such as 0xFF or 0xFFFF.

Additionally, for certain processing units, the opcode 0x00 or 0x0000 is not used. Thus, the processing unit 20 may overwrite the first instruction of the function with an invalid opcode, which may be 0x00 or 0x0000.

Note that while OTP memory devices are only programmable once, it is possible to change the state of certain bits after the device has been programmed. Specifically, certain OTP memory devices are configured such that the default state of all bits is "0". Thus, when a value is written to a location in the OTP memory device, only the bits that are being changed to "1" are actually programmed. In this case, the remaining bits (which remain "0") can be later programmed to a "1" state. However, in these OTP memory devices, a "1" cannot be changed back to a "0". Thus, for these OTP memory devices, a memory location can always be written to 0xFF, regardless of how it was originally programmed.

Conversely, there are also OTP memory devices are configured such that the default state of all bits is "1". Thus, when a value is written to a location in the OTP memory device, only the bits that are being changed to "0" are actually programmed. In this case, the remaining bits (which remain "1") can be later programmed to a "0" state. However, in these OTP memory devices, a "0" cannot be changed back to a "1". Thus, for these OTP memory devices, a memory location can always be written to 0x00, regardless of how it was originally programmed. Thus, for this second type of OTP memory device, the opcodes are written to 0x00 or 0x0000 by the processing unit 20.

Thus, once the first instruction of a function is overwritten with an invalid opcode, the processing unit 20 will execute an exception handler whenever it attempts to execute this instruction. An exception handler is a software program that is automatically executed by the processing unit 20 when the processing unit 20 encounters an error. The exception handler may be part of the instructions 22 located in the OTP memory device 21, or may be written in the RAM device 25.

Figure 2:
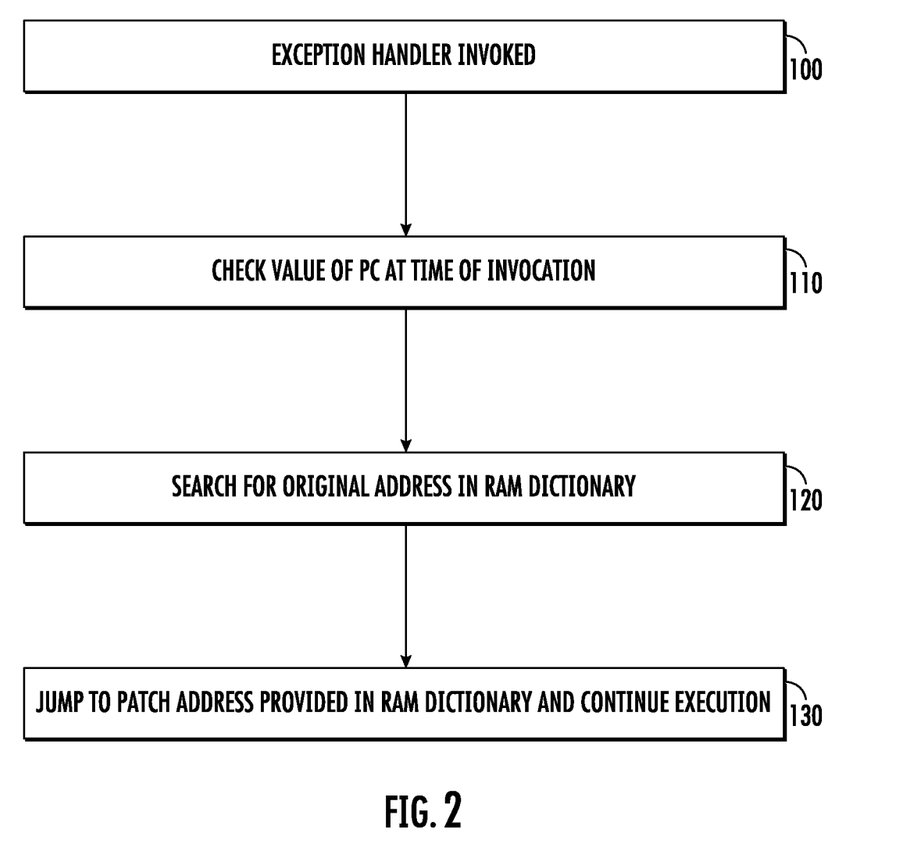
FIG. 2 shows a flowchart that shows the operation of the device when an illegal instruction is encountered.

FIG. 2 shows the operation of the processing unit 20 when executing this exception handler. First, as shown in Box 100, the exception handler is invoked when the processing unit 20 attempts to executed an invalid opcode. The address of the exception handler may be written to a vector table that the processing unit 20 accessed when an exception is encountered. The processing unit 20 then executes the instructions contained within the exception handler. The exception handler causes the processing unit to determine the value of the program counter (PC) at the time of the exception, as shown in Box 110. This value is the address of the instruction that the processing unit 20 was attempting to execute. Having determined this address (which is referred to as the original address), the exception handler then causes the processing unit 20 to access the RAM dictionary 27, searching for the original address, as shown in Box 120. Once the original address is found, the patch address, which is stored with the original address, is then loaded into the program counter and execution continues at this patch address, as shown in Box 130.

Thus, the method of patching a function includes the following steps. The new patched function is stored in a portion of the RAM device 25. A RAM dictionary 27 is created that correlates the original address in the OTP memory device 21 with the patch address in the RAM device 25. The instruction at the original address of the function in OTP memory device 21 is overwritten with an invalid opcode. The exception handler allows the processing unit 20 to jump to the patched function by determining the patch address from the appropriate entry in the RAM dictionary 27.

During normal operation, the mechanism above is sufficient to implement the code updates. However, there are other situations that may occur that require further modifications to this mechanism.

First, assume, in one scenario, that the network device 10 were to lose power after all of the modifications have been applied. In this case, the RAM dictionary 27 and the patched functions 26 will be invalid, since this data is stored in a volatile memory. However, the invalid opcodes in the OTP memory device 21 are still present, as these are stored in nonvolatile memory. Therefore, during operation after a power loss, the processing unit 20 will attempt to execute invalid instructions, without having the RAM dictionary 27 or the patched functions 26. Consequently, there needs to be a mechanism to allow the network device to operate properly until the patches can be reapplied.

In one embodiment, an OTP dictionary 23 is created in the OTP memory device 21. The OTP dictionary 23 contains a table of entries, where each entry is an address that has been overwritten (also referred to as a fault address), and the opcode that was originally at that location prior to being overwritten.

Figure 3:
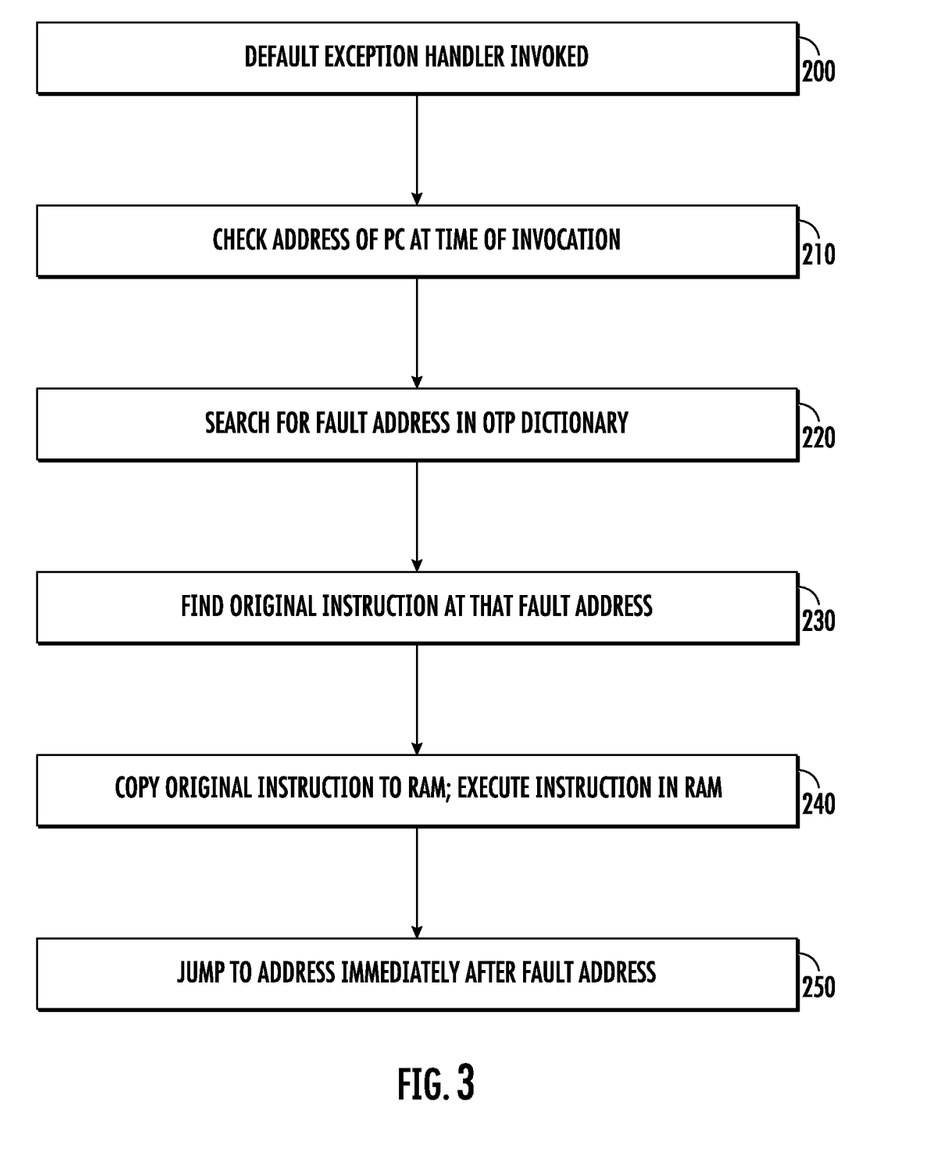
FIG. 3 shows a flowchart that may be executed by a default exception handler when an illegal instruction is encountered.

Thus, a default exception handler may be used. The default exception handler is a software program that is automatically executed by the processing unit 20 when the processing unit 20 encounters an error. The default exception handler may be part of the instructions 22 located in the OTP memory device 21. Thus, before any patches have been applied, the vector table of the processing unit 20 will point to the default exception handler. The operation of the processing unit 20 when executing this default exception handler is shown in FIG. 3. As shown in Box 210, the default exception handler causes the processing unit 20 to determine the value of the program counter when the default exception handler was invoked. This value may be referred to as the fault address. This default exception handler may cause the processing unit 20 to search the OTP dictionary 23 for the fault address that caused the exception, which is the address with the invalid opcode, as shown in Box 220. The processing unit 20 then finds the original opcode that was located at the fault address, as shown in Box 230. As shown in Box 240, the default exception handler causes the processing unit 20 to copy the opcode to a temporary address in a region of the RAM device 25. The default exception handler then causes the processing unit 20 to write the next address after the temporary address with data that includes a JUMP opcode and the address following the original address so allow the processing unit 20 to return to the original function in the OTP memory device 21, as shown in Box 250. Thus, in this mode, the processing unit 20 encounters an invalid opcode, which causes the default exception handler to be invoked. The default exception handler causes the processing unit 20 to then search the OTP dictionary 23 for the fault address that caused the exception. The processing unit 20 then determines the opcode that was written at the fault address prior to being overwritten. The processing unit 20 then writes this opcode to a temporary address in the RAM device 25, along with a JUMP opcode to allow the processing unit to return to the instructions in the OTP memory device 21.

In another embodiment, the default exception handler may cause the processing unit 20 to copy the original opcode and the remainder of the original function into the temporary location in the RAM device 25. In this way, the entirety of the original function is located in the RAM device 25.

Figure 4:
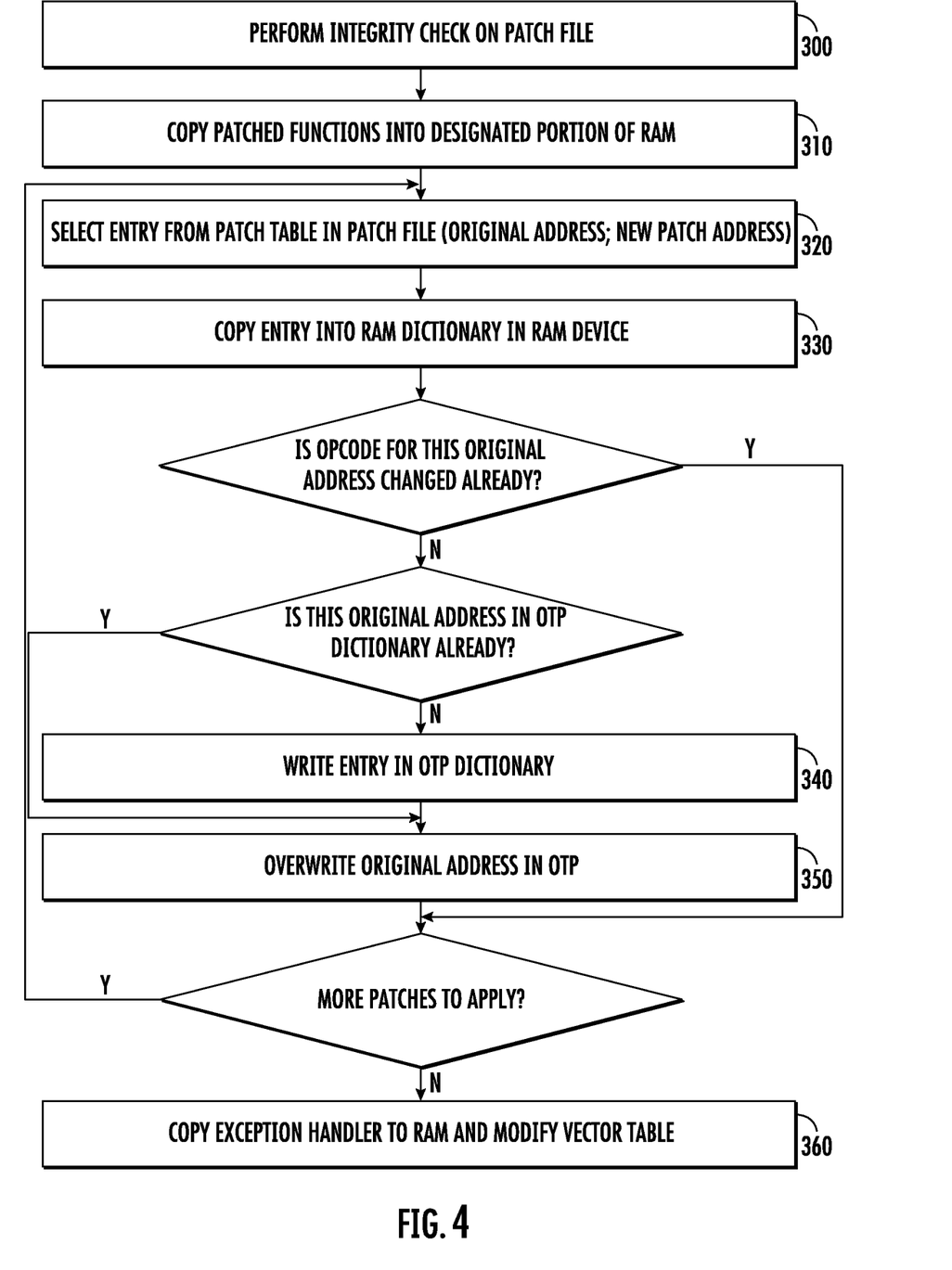
FIG. 4 shows a flowchart showing how the patches may be incorporated into the network device.

Having described the mechanism for executing the patched functions, the process for implementing the patched functions will now be described. The process is shown in FIG. 4.

Figure 5:
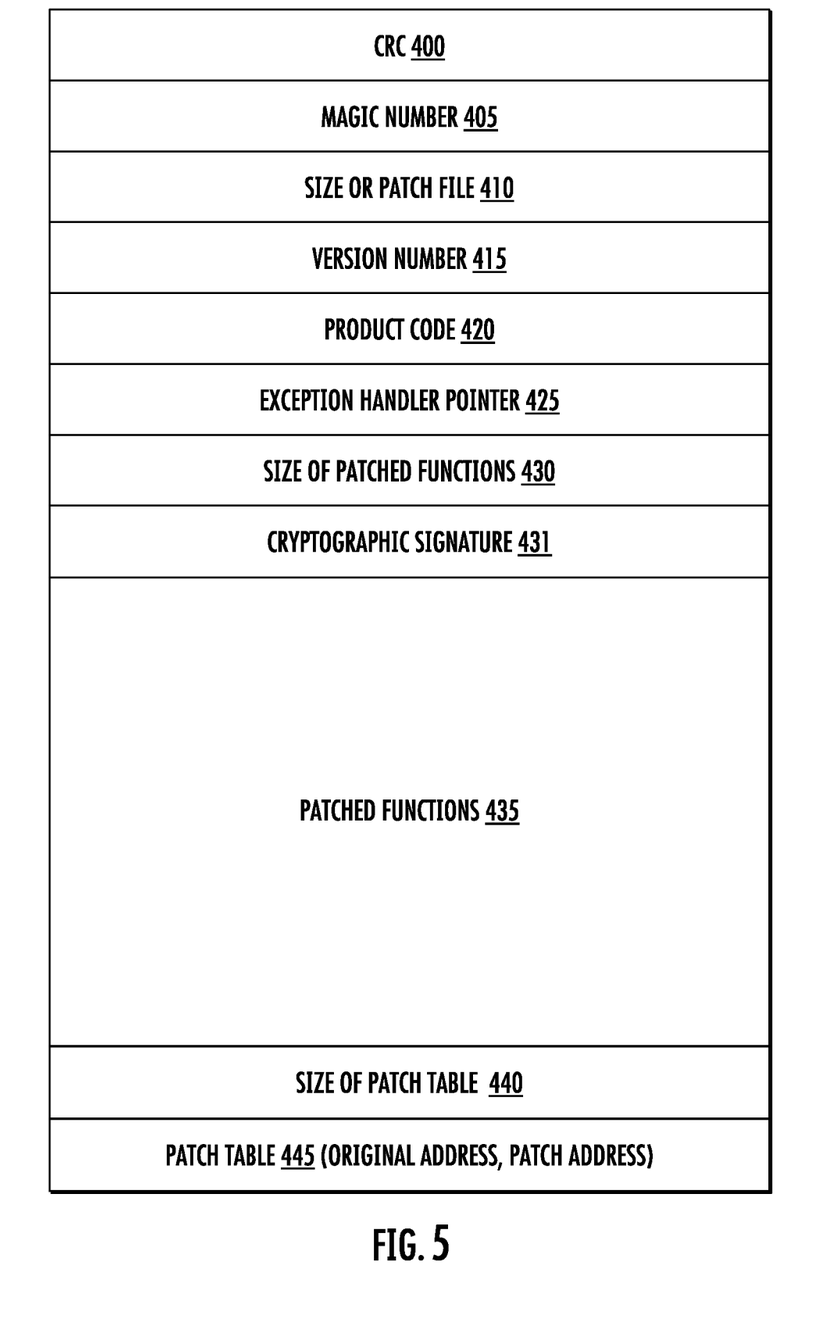
FIG. 5 shows the format of the patch file according to one embodiment.

First, a patch file is transmitted to the network device 10. This may be communicated using the network interface 30. The patch file is shown in FIG. 5 and may include various software structures. These include:

A cyclic redundancy code (CRC) 400;
A magic number 405;
The size of the patch file 410;
A version number 415;
A product code 420;
A pointer to the exception handler 425;
The size of the patched functions 430;
A cryptographic signature 431;
The patched functions 435;
The size of the patch table 440; and
A patch table 445.

When the patch file is received, its integrity is checked by the processing unit 20, as shown in Box 300. The integrity check may include:

Confirming that the actual size of the patch file matches the size of the patch file 410, provided in the patch file;
Ensuring that the magic number 405 supplied in the patch file is the value expected;
Confirming that the CRC 400 of the patch file matches the value supplied in the patch file;
Verifying a cryptographic signature 431 (if present) to ensure that only devices that have the key can open the patch file; and
Confirming that the patch is intended for this product by comparing the product code 420 supplied by the patch file to the actual product code.

Once the integrity of the patch file has been verified, the processing unit 20 may copy the patched functions 435 into the RAM device 25, as shown in Box 310. The starting address into which the patched functions 435 are copied may be fixed by the patch file. In this way, the patch file knows the starting address for each patched function 435 in the RAM device 25. This may be necessary, as the patch table 445 includes the starting address of each patched function 435.

The processing unit then parses each of the entries in the patch table 445 that is provided in the patch file. First, the processing unit 20 selects an entry in the patch table 445 provided in the patch file, as shown in Box 320. Each entry in the patch table 445 includes the original address of the original function and the new address of the patched function, referred to as the patch address. The processing unit 20 copies this entry into the RAM dictionary 27, as shown in Box 330. This creates the association between the address of the original function in the OTP memory device 21 and the address of the patched function in the RAM device 25. Next, the processing unit 20 checks to see if the original address has been written with an invalid opcode. If an invalid opcode has already been written, this implies that the patch was previously applied, and power has been lost since that time. Thus, in this scenario, only the values that are written to the RAM device 25 need to be written. Thus, if an invalid opcode is already written, the processing unit 20 skips several steps and checks if there are more entries in the patch table 445 that need to be processed.

If, however, an invalid opcode has not been written, there are several possible scenarios. In one scenario, this is a new patch that has not been previously applied. In a second scenario, this patch was partially applied, but power was lost prior to writing the invalid opcode. In this scenario, it is possible that an entry associated with this patch was already written into the OTP dictionary 23.

Therefore, the processing unit 20 next checks whether there is an entry in the OTP dictionary 23 that corresponds with this entry in the patch table 445. If the original address provided by the patch table 445 appears in the OTP dictionary 23, then the OTP dictionary 23 was previously updated and does not have to be updated again. If, however, the original address is not found in the OTP dictionary 23, the processing unit 20 writes the original address and the opcode that is located at that address into the OTP dictionary 23, as shown in Box 340. The processing unit then overwrites the opcode located at the original address with an invalid opcode, as shown in Box 350.

The processing unit 20 then checks if there are additional entries in the patch table 445 that need to be processed. If so, the processing unit 20 repeats the sequence described above. If there are no additional entries, the processing unit 20 then copies the exception handler to the RAM device 25, using the exception handler pointer 425. The exception handler may be included in the patched functions 435. The processing unit 20 than loads the exception handler pointer in the vector table, as shown in Box 360. Thus, after a patch is applied, the default exception handler (described in FIG. 3) may no longer be used. Rather, it may be replaced by an exception handler that was part of the patch file. The operation of this new exception handler is described in FIG. 2. In other words, the default exception handler is executed until the RAM dictionary and the modified functions have been loaded in the RAM device 25.

The present system and methods have many advantages. The present method allows for an efficient mechanism to patch software that is located in an OTP memory device. Unlike patching techniques that are used for ROM the present method overwrites the starting address of a function that has been patched. In this way, the software that is originally used for a FLASH-based device and an OTP-based device may be identical. This reduces the number of different versions of the software that must be maintained and updated by the development team.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of updating software located in a one time programmable (OTP) memory device, comprising:
    storing a modified function at a patch address in a volatile memory device;
    storing an exception handler in the volatile memory device;

creating an entry in a RAM dictionary located in the volatile memory device, wherein the entry comprises an original address of an original function in the OTP memory device and the patch address; and overwriting an opcode at the original address with an invalid opcode so as to invoke an exception, wherein the exception handler uses the original address to locate the entry in the RAM dictionary with the patch address and causes the modified function stored at the patch address to be executed.

2. The method of claim 1, wherein the invalid opcode comprises either all 1s or all 0s.

3. The method of claim 1, further comprising:
creating an entry in an OTP dictionary in the OTP memory device, wherein the entry comprises the original address of the original function and the opcode originally at the original address prior to being overwritten.

4. The method of claim 3, wherein the entry in the OTP dictionary is created prior to overwriting the opcode.

5. The method of claim 3, wherein the entry in the OTP dictionary is created only if the opcode has not been overwritten previously.

6. A method of executing instructions located in a one time programmable (OTP) memory device using a processing unit, wherein the instructions include a function that has been modified and a modified function is located at a patch address in a volatile memory device, the method comprising:

encountering an invalid opcode at an original address corresponding to a beginning of the function; and executing an exception handler, in response to the invalid opcode, wherein the exception handler causes the processing unit to:

determine a value of a program counter when the invalid opcode was encountered, the value of the program counter being the original address;

search a RAM dictionary, located in the volatile memory device, wherein the RAM dictionary comprises an entry that comprises the original address and the patch address;

jump to the patch address corresponding to the original address; and execute the modified function.

7. The method of claim 6, wherein the invalid opcode comprises either all 1s or all 0s.

8. The method of claim 6, wherein the exception handler is located in the volatile memory device.

9. A method of executing instructions located in a one time programmable (OTP) memory device using a processing unit, wherein an opcode at a beginning of an original function disposed in OTP has been modified to an invalid opcode, the method comprising:

encountering the invalid opcode at an original address corresponding to the beginning of the original function; and executing a default exception handler or an exception handler in response to the invalid opcode, wherein the default exception handler causes the processing unit to execute the original function and the exception handler causes the processing unit to execute a modified function located in a volatile memory device.

10. The method of claim 9, wherein the invalid opcode overwrote an original opcode during a previous patch.

11. The method of claim 10, wherein the default exception handler causes the processing unit to:

determine a value of a program counter when the invalid opcode was encountered, the value of the program counter being a fault address;

search an OTP dictionary, located in the OTP memory device, wherein the OTP dictionary comprises an entry that comprises the fault address and the original opcode;

create one or more instructions in the volatile memory device using the original opcode;

execute the one or more instructions; and execute a remainder of the original function.

12. The method of claim 9, wherein the exception handler causes the processing unit to:

determine a value of a program counter when the invalid opcode was encountered, the value of the program counter being the original address;

search a RAM dictionary, located in the volatile memory device, wherein the RAM dictionary comprises an entry that comprises the original address and a patch address;

jump to the patch address corresponding to the original address; and execute the modified function located starting at the patch address.

13. The method of claim 12, wherein the default exception handler is executed until the modified function and the RAM dictionary are written in the volatile memory device.

14. The method of claim 9, wherein the invalid opcode comprises either all 1s or all 0s.

15. The method of claim 9, wherein the exception handler is located in the volatile memory device.

16. The method of claim 9, wherein the default exception handler is located in the OTP memory device.

17. The method of claim 9, wherein a RAM dictionary is used to store an address of the modified function and wherein the default exception handler is executed until the modified function and the RAM dictionary are written in the volatile memory device.

* * * * *